(12) United States Patent
Nefcy et al.

(10) Patent No.: US 9,096,208 B2
(45) Date of Patent: Aug. 4, 2015

(54) CONTROLLING A TRACTION MOTOR DURING ENGINE PULL-UP IN A VEHICLE

(75) Inventors: Bernard D. Nefcy, Novi, MI (US); Daniel Scott Colvin, Farmington Hills, MI (US); Michael John Encelewski, Northville, MI (US); Charles Chunlin Liu, Plymouth, MI (US); Felix Nedorezov, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 638 days.

(21) Appl. No.: 13/465,739

(22) Filed: May 7, 2012

(65) Prior Publication Data

US 2013/0296113 A1 Nov. 7, 2013

(51) Int. Cl.
*B60W 10/08* (2006.01)
*B60W 10/02* (2006.01)
*B60W 20/00* (2006.01)
B60K 6/48 (2007.10)

(52) U.S. Cl.
CPC .............. *B60W 10/02* (2013.01); *B60W 10/023* (2013.01); *B60W 10/08* (2013.01); *B60W 20/00* (2013.01); *B60W 20/40* (2013.01); B60K 2006/4825 (2013.01); B60W 2510/0638 (2013.01); B60W 2710/025 (2013.01); B60W 2710/081 (2013.01); Y02T 10/6252 (2013.01); Y10T 477/26 (2015.01)

(58) Field of Classification Search
CPC ...... B60W 10/08; B60W 10/02; B60W 20/40
See application file for complete search history.

(56) References Cited

U.S. PATENT DOCUMENTS

| | | | |
|---|---|---|---|
| 6,882,909 | B2 | 4/2005 | Lee |
| 8,050,831 | B2 | 11/2011 | Martin et al. |
| 2005/0155803 | A1* | 7/2005 | Schiele ........................ 180/65.2 |
| 2008/0228363 | A1* | 9/2008 | Kouno et al. ................... 701/54 |
| 2011/0112709 | A1 | 5/2011 | Park et al. |

* cited by examiner

*Primary Examiner* — Derek D Knight
(74) *Attorney, Agent, or Firm* — David B. Kelley; Brooks Kushman P.C.

(57) ABSTRACT

A vehicle includes an engine and a traction motor. A clutch is configured to selectively mechanically couple the engine to the traction motor. A controller or controllers are provided that are configured to command a change in magnitude of an electric current supplied to the electric machine. The command is made in response to initiation of the clutch engaging the traction motor to the engine. The change in magnitude of the electric current ensures the speed of the traction motor remains generally constant during clutch engagement while a speed of the engine is less than that of the traction motor.

15 Claims, 3 Drawing Sheets

CONTROLLING A TRACTION MOTOR DURING ENGINE PULL-UP IN A VEHICLE

TECHNICAL FIELD

The present disclosure relates to the control of torque in a traction motor of a hybrid electric vehicle at times in which the engine is being pulled-up.

BACKGROUND

Hybrid electric vehicles (HEV's) include an internal combustion engine and an electric traction motor to provide power to propel the vehicle. One method of increasing fuel economy in an HEV is to shut down the engine when the overall power demands are low. However, if the overall power demands increase such that the traction motor cannot provide enough power to meet the demand, or if the fraction battery state of charge (SOC) is below a certain threshold, the engine must be activated to supplement the power output of the traction motor.

SUMMARY

According to one embodiment of the present disclosure, a vehicle includes an engine, and electric machine, and a clutch configured to couple the engine and the electric machine. At least one controller is configured to command a change in magnitude of a current supplied to the electric machine in response to initiation of clutch engagement. The speed of the electric machine remains generally constant during clutch engagement. A speed of the engine is less than the speed of the electric machine during clutch engagement and while the speed of the electric machine is generally constant.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
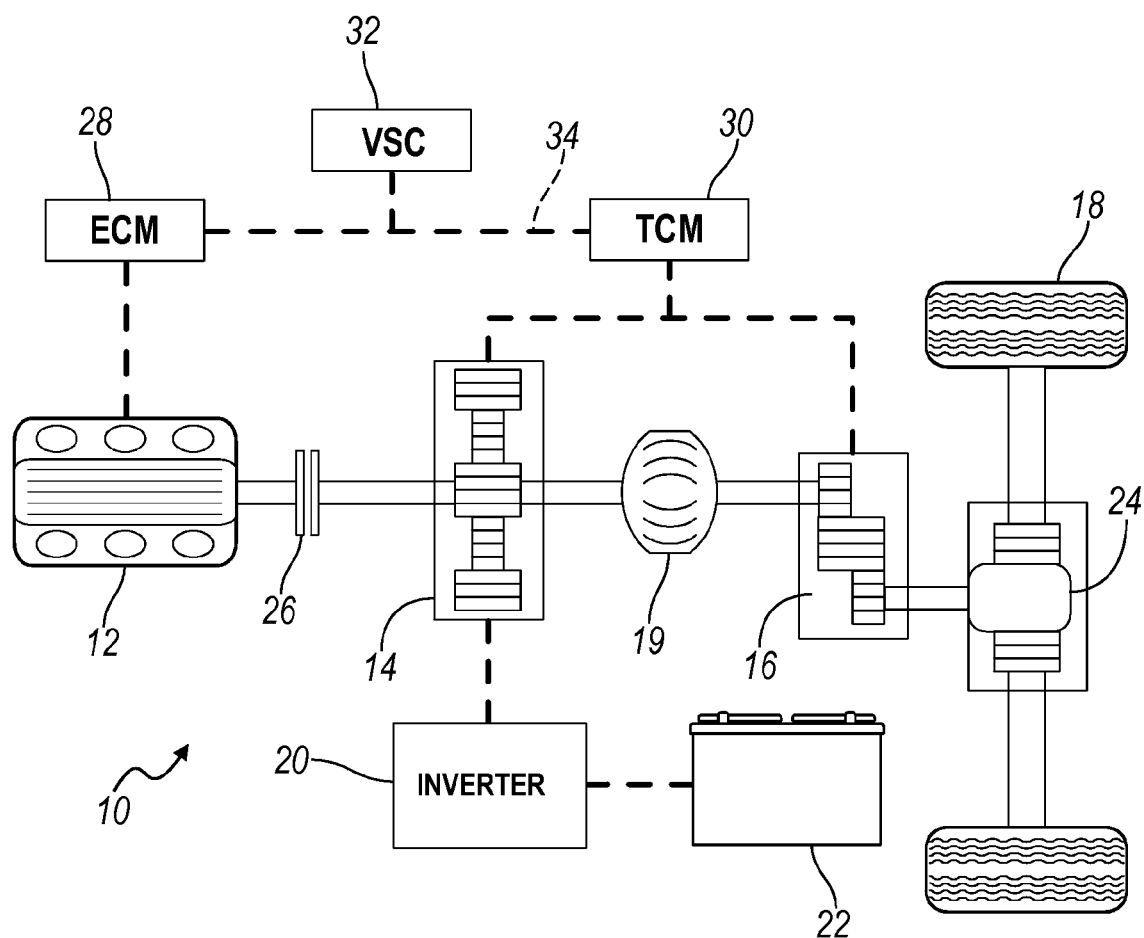
FIG. 1 is a schematic illustration of a powertrain of a hybrid electric vehicle.

Referring to FIG. 1, a schematic diagram of a vehicle 10 is illustrated according to one embodiment of the present disclosure. The vehicle 10 is an HEV. The powertrain or driveline of the vehicle 10 includes an engine 12, an electric machine or motor/generator (M/G) 14, and a transmission 16 disposed between the M/G 14 and wheels 18. A torque converter 19 can optionally be provided between the M/G 14 and the transmission 16. The torque converter 19 transfers rotating power from the M/G 14 to the transmission 16. It should be understood that instead of a torque converter 19, one or more clutches can be provided to selectively transfer torque from the M/G 14 to the transmission 16. Other configurations are also possible.

The M/G 14 can operate as a generator by receiving torque from the engine 12 and supplying AC voltage to an inverter 20, whereby the inverter 20 converts the voltage into DC voltage to charge a traction battery, or battery 22. The M/G 14 can operate as a generator by utilizing regenerative braking to convert the braking energy of the vehicle 10 into electric energy to be stored in the battery 22. Alternatively, the M/G 14 can operate as a motor. The M/G 14 receives power from the inverter 20 and battery 22 and provides torque through the torque converter 19 (or clutch), through the transmission 16 and ultimately to the wheels 18. A differential 24 can be provided to distribute torque from the output of the transmission 16 to the wheels 18.

A first clutch, or disconnect clutch 26, is located between the engine 12 and the M/G 14. The disconnect clutch 26 can be fully open, partially engaged, or fully engaged (locked). In order to start the engine 12, the M/G 14 rotates the engine 12 when the disconnect clutch 26 is at least partially engaged. Once the engine 12 is rotated by the M/G 14 to a certain speed (e.g., ~100-200 rpm), fuel entry and ignition can commence. This enables the engine 12 to "start" and to provide torque back to the M/G 14; the M/G 14 can charge the battery 22 and/or distribute torque from the engine 12 to the torque converter 19, through the transmission 16 and ultimately to the wheels 18. In another embodiment, a separate engine starter motor (not shown) can be provided.

The vehicle 10 also includes a control system, shown in the embodiment of FIG. 1 as three separate controllers: an engine control module (ECM) 28, a transmission control module (TCM) 30, and a vehicle system controller (VSC) 32. The ECM 28 is directly connected to the engine 12, and the TCM 30 can be connected to the M/G 14 and the transmission 16. The three controllers 28, 30, 32 are connected to each other via a controller area network (CAN) 34. The VSC 32 commands the ECM 28 to control the engine 12 and the TCM 30 to control the M/G 14 and the transmission 16. Although the control system of the vehicle 10 includes three separate controllers, such a control system can include more or less than three controllers as desired. For example, a separate motor control module can be directly connected to the M/G 14 and to the other controllers in the CAN 34.

As previously described, the M/G 14 is utilized to start the engine 12. This is referred to as engine pull-up. It can be advantageous to pull-up the engine 12 in order to spin the M/G 14 and charge the battery 22, for example. It can also be advantageous to pull-up the engine 12 to satisfy acceleration demands. During engine pull-up, the disconnect clutch 26 is at least partially engaged, and torque from the M/G 14 is applied through the disconnect clutch 26 and to the engine 12. Once the engine 12 is pulled-up, a boost of torque can be provided through the powertrain due to, for example, sudden ignition in the engine 12. The increase in speed of the engine after engine pull-up can be translated into increased rotational speed of the M/G 14. Increased rotational speed of the M/G 14 causes the battery 22 to be charged and/or more torque to be applied to the torque converter 19, as previously described. Once the battery 22 is sufficiently charged and the vehicle 10 does not require engine power for propulsion, the engine 12 can be disabled or pulled-down.

According to one embodiment of the present disclosure, the M/G 14 is controlled to combat the torque boost provided from the engine 12 during engine pull-up. Once the engine 12 is pulled-up and activated and the disconnect clutch 26 is partially engaged or locked, the M/G 14 provides torque back towards the engine 12 in an opposite direction as the engine torque to counteract the engine torque.

During this torque transfer between the M/G 14 and the engine 12, the VSC 32 can control the powertrain such that torque noise is not felt at the wheels 18. Changes in rotational speed of the M/G 14 necessarily change the input of the torque converter 19, which in turn can alter the rotational speed in the input of the transmission 16. If the transmission input speed increases, speed at the wheels 18 increase. Therefore during engine pull-up and pull-down, the M/G 14 can be controlled to increase torque to counteract the engine torque while remaining at a generally constant speed such that speed fluctuations are not transferred to the wheels 18, as will be further described below. A clutch downstream of the torque converter 19 (e.g., in the transmission 16) may also be slipped during engine pull-up to assure that the speed of the M/G 14 remains generally constant during engagement of the disconnect clutch 26.

Figure 2:
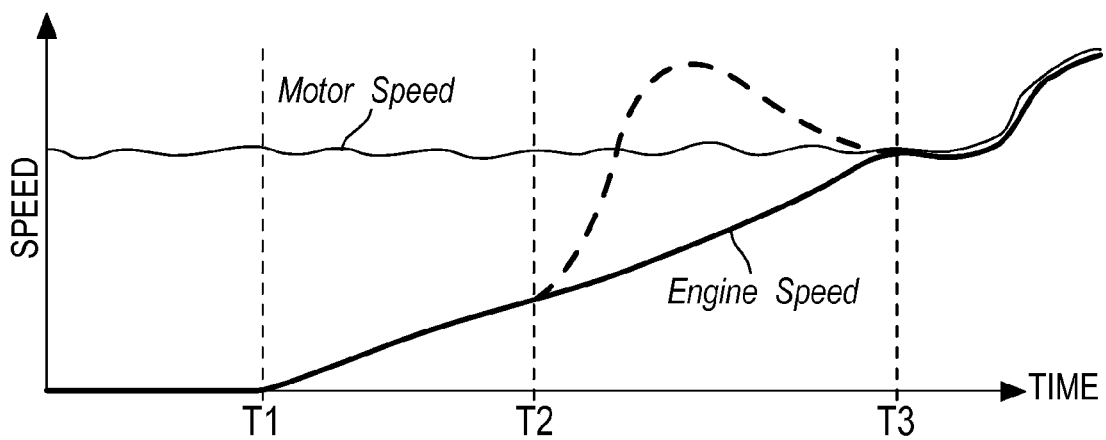
FIG. 2 is a graphical representation of motor speed and engine speed while the engine is being pulled-up.

Referring to FIGS. 1 and 2 the speed of the M/G 14 ("motor speed") and the speed of the engine 12 ("engine speed") are illustrated. Up until time T1, the motor speed is generally constant such that the torque at the wheels 18 is generally constant. At time T1, conditions as described above cause the VSC 32 to command the disconnect clutch 26 to partially engage. Because the speed of the M/G 14 is greater than the speed of the engine 12, the engine speed begins to rise. As will be discussed with reference to FIG. 3, however, the motor speed remains generally constant throughout the engagement of the disconnect clutch 26 (between times T1-T3) such that the torque input into the torque converter 19 remains generally constant.

At time T2, ignition occurs. Ignition can occur anywhere between T1 and T3, and the amount of time between T1-T2 and T2-T3 can alter (FIG. 2 illustrates but one example). Ignition causes the engine speed to continue to increase. At a point where the motor speed and the engine speed are generally equivalent (e.g., within 20 rpms), the VSC 32 can command the disconnect clutch 26 to lock as will be discussed with reference to time T3. FIG. 2 also includes a dotted line that represents an example of the engine speed continuing to rise beyond the motor speed. This line represents what can happen if too much torque boost occurs after ignition, and the motor torque does not alter to combat the boost in speed and torque from the engine 12. The altering of the motor torque can inhibits the engine speed from increasing to a level above that of the motor speed.

At time T3, the disconnect clutch 26 is locked, and the motor speed and the engine speed are equivalent. At any time after T3 as driver torque demands increase or decrease, both the engine speed and the motor speed increase or decrease accordingly, due to the power increases in the engine.

Figure 3:
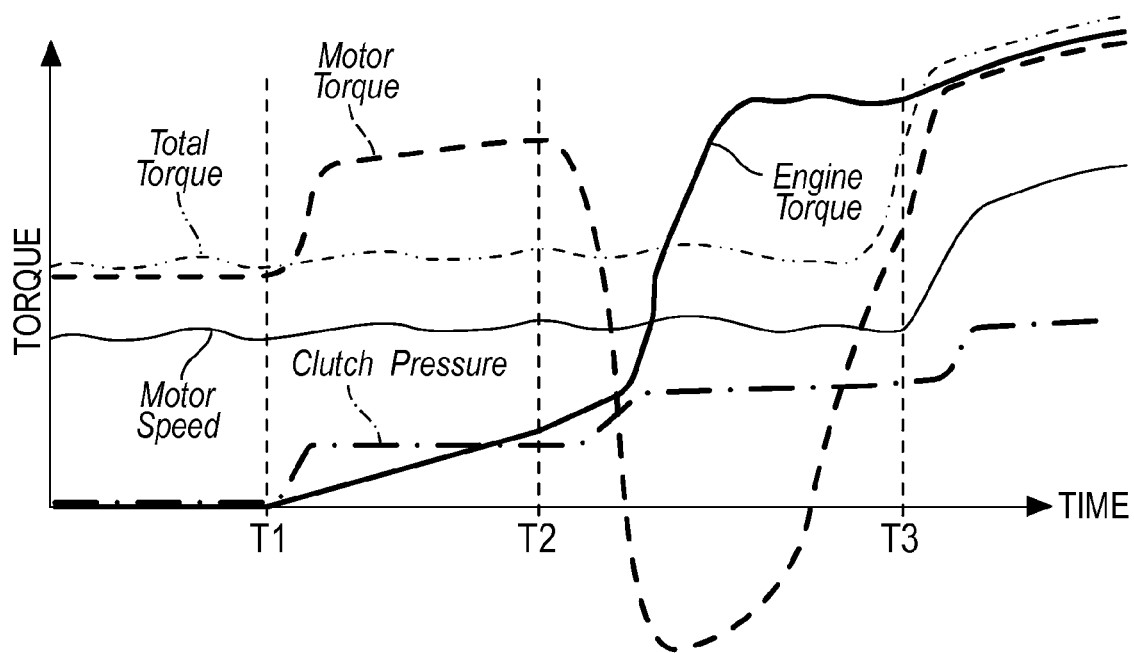
FIG. 3 is a graphical representation of motor torque and engine torque as the engine is pulled-up.

Referring to FIG. 3, various torques, speeds, and pressures are illustrated and will now be described. Times T1, T2 and T3 represent the points of partial engagement of the disconnect clutch 26, ignition, and locking of the disconnect clutch 26, respectively, as in FIG. 2.

Before time T1, the motor speed is generally constant, and the torque of the M/G 14 ("motor torque") is also generally constant. The pressure of the arrangement of the disconnect clutch 26 ("clutch pressure") is at or about 0, as the disconnect clutch is open such that the M/G 14 and the engine 12 are not coupled. The torque of the engine 12 ("engine torque") is therefore also at or about 0, as the engine is disabled. The total torque felt at the wheels 18 of the vehicle also remains generally constant, consistent with the motor speed.

At time T1, the VSC 32 commands the disconnect clutch 26 to initiate engagement. This is seen as the clutch pressure increases (e.g., to about 100 lbs). The motor torque begins to rise to start pulling-up the engine 12, while the disconnect clutch 26 is slipping and motor speed remains generally constant. The total torque felt at the wheels remains generally constant due to the slipping of the disconnect clutch 26. The increase in torque to the M/G 14 is accomplished by increasing the electric current supplied to the M/G 14 from the inverter 20 and battery 22 while maintaining the speed of the M/G 14.

At time T2, ignition in the engine 12 occurs. Ignition can occur anywhere between T1 and T3, and the amount of time between T1-T2 and T2-T3 can alter FIG. 3 illustrates but one example). The clutch pressure can remain generally constant between times T2 and T3, or can change in magnitude to achieve a desired engine speed and torque. At some time immediately following ignition, the engine torque begins to rise rapidly. The motor torque correspondingly decreases due to a change in magnitude of the electric current supplied to the M/G 14. The decrease in motor torque corresponds to the increase in engine torque so that the motor speed remains generally constant while quick engagement of the disconnect clutch 26 can occur. At some time between T2 and T3, the motor torque is negative. This indicates a motor torque increase in a direction opposite to the engine torque. The motor torque can remain negative until a desired capacity in the disconnect clutch 26 is reached. The desired capacity is the capacity in the disconnect clutch 26 to carry the requested torque from the engine 12, plus any safety factor.

Once the desired capacity is reached, the motor torque can return in a positive direction, corresponding to time T3 in which the disconnect clutch 26 is locked. Once the disconnect clutch 26 is locked, the motor speed and engine speed (not shown) are equal, and the disconnect clutch synchronizes the speeds of each of the M/G 14 and engine 12. At any time after time T3, any changes in desired torque to the vehicle 10 results in a direct corresponding change in engine torque and motor torque, as well as engine speed and motor speed. Furthermore, the clutch pressure can continue to rise to maintain the synchronous state of the disconnect clutch 26.

The control system as illustrated in FIGS. 1-3 can allow for a quick boost in engine torque. Furthermore, if a change in speed of the vehicle 10 is not desired during engine pull-up, the motor torque can be altered to maintain motor speed. Once an operator of the vehicle 10 desires an increase in speed, the control system allows for the engine 12 to engage quickly to efficiently provide torque to the wheels 18.

Figure 4:
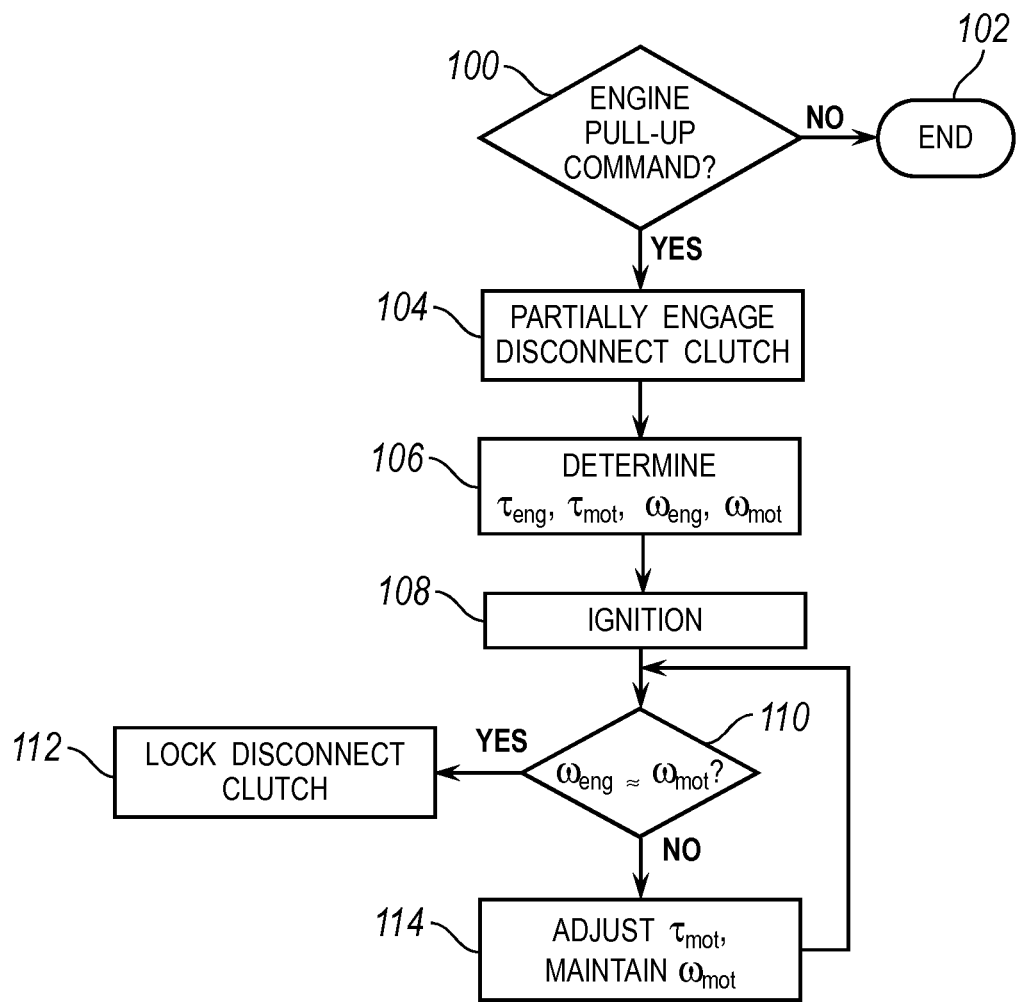
FIG. 4 is a flow chart of an algorithm for controlling a vehicle.

Referring to FIGS. 1 and 4, an algorithm for controlling the vehicle 10 is illustrated according to one embodiment of the present disclosure. The algorithm can be implemented by VSC 32, for example. At operation 100, the VSC 32 determines if an engine pull-up command is necessary. As previously described, this can be based on the SOC of the battery 22, for example. If there is no engine pull-up command necessary, the algorithm ends at operation 102. If circumstances exist that necessitate an engine pull-up command, the disconnect clutch 26 is partially engaged at operation 104. This begins to rotate a shaft of the engine 12. At operation 106, the VSC 32 determines the torque of the engine 12 ($\tau_{eng}$) and of the M/G 14 ($\tau_{mot}$), as well as the speed of the engine 12 ($\omega_{eng}$) and the M/G 14 ($\omega_{eng}$). After the disconnect clutch 26 is partially engaged, ignition occurs in the engine 12 at operation 108.

At operation 110, a determination is made as to whether the speed of the engine 12 is generally equivalent to the speed of the motor. During engine pull-up and shortly after ignition, if the speeds are generally equivalent, the disconnect clutch 26 is locked such that the speeds are locked together, and any speed increases in the engine 12 translate into speed increases in the M/G 14. If the relative speeds at operation 110 are not generally equivalent, then at 114 the VSC 32 adjusts the torque of the M/G 14 while maintaining the speed of the M/G 14 to be relatively constant. The adjustment of the torque of the M/G 14 can continue until the relative speeds of the engine 12 and M/G 14 are generally equivalent, while maintaining the speed of the M/G 14.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an engine;
   an electric machine (EM);
   a clutch configured to couple the engine and EM; and
   at least one controller configured to command a change in magnitude of a current supplied to the EM in response to initiation of clutch engagement and based on engine torque such that a speed of the EM remains generally constant during clutch engagement while the speed of the EM exceeds a speed of the engine.

2. The vehicle of claim 1, wherein after clutch engagement, the change in magnitude of the current supplied to the electric machine increases a torque output by the electric machine in a direction opposite to the engine torque such that the speed of the electric machine remains generally constant until the clutch achieves a desired capacity.

3. The vehicle of claim 2, wherein after clutch engagement, the change in magnitude of the current supplied to the electric machine increases the torque output by the electric machine in the direction opposite to the engine torque such that the speed of the engine is approximately equal to the speed of the electric machine.

4. The vehicle of claim 1 further comprising a torque converter, transmission gearing, and another clutch configured to mechanically couple the torque converter and transmission gearing, wherein the at least one controller is further configured to alter a slip of the another clutch based on the current supplied to the electric machine such that the speed of the electric machine remains generally constant during engagement of the clutch.

5. A vehicle comprising:
   an engine;
   an electric machine;
   a clutch configured to mechanically couple the engine and electric machine; and
   at least one controller configured to command a change in magnitude of a current supplied to the electric machine based on a speed of the engine, engine torque, and a speed of the electric machine such that the speed of the electric machine remains generally constant before and during engagement of the clutch.

6. The vehicle of claim 5, wherein after engagement of the clutch, the change in magnitude of the current supplied to the electric machine increases a torque output by the electric machine in a direction opposite to the engine torque such that the speed of the electric machine remains generally constant until the clutch achieves a desired capacity.

7. The vehicle of claim 6, wherein after engagement of the clutch, the change in magnitude of the current supplied to the electric machine increases the torque output by the electric machine in the direction opposite to the engine torque such that the speed of the engine is approximately equal to the speed of the electric machine.

8. The vehicle of claim 5 further comprising a torque converter, transmission gearing, and another clutch configured to mechanically couple the torque converter and transmission gearing, wherein the at least one controller is further configured to alter a slip of the another clutch based on the current supplied to the electric machine such that the speed of the electric machine remains generally constant during engagement of the clutch.

9. A method for controlling a vehicle driveline comprising:
   initiating engagement of a clutch to mechanically couple an engine to an electric machine; and
   altering a magnitude of current supplied to the electric machine in response to the initiating and based on engine torque such that a speed of the electric machine remains generally constant during engagement of the clutch while a speed of the engine is less than the speed of the electric machine.

10. The method of claim 9, wherein after engagement of the clutch, the altering of the magnitude of current increases a torque output by the electric machine in a direction opposite to the engine torque such that the speed of the electric machine remains generally constant until the clutch achieves a desired capacity.

11. The method of claim 10 further comprising locking the clutch after the clutch achieves the desired capacity.

12. The method of claim 11 further comprising changing the direction of the torque output by the electric machine in response to the locking of the clutch.

13. The method of claim 9 further comprising altering a slip of another clutch configured to mechanically couple a torque converter to transmission gearing, wherein the altering of the slip is based on the current supplied to the electric machine such that the speed of the electric machine remains generally constant during engagement of the clutch.

14. The vehicle of claim 1, wherein the at least one controller is further configured to decrease a torque of the electric machine based on an increase in engine torque while maintaining the speed of the electric machine generally constant while the speed of the engine increases toward the speed of the electric machine.

15. The vehicle of claim 5, wherein the at least one controller is further configured to decrease a torque of the electric machine based on an increase in engine torque while maintaining the speed of the electric machine generally constant while the speed of the engine increases toward the speed of the electric machine.

* * * * *